Figure 1:
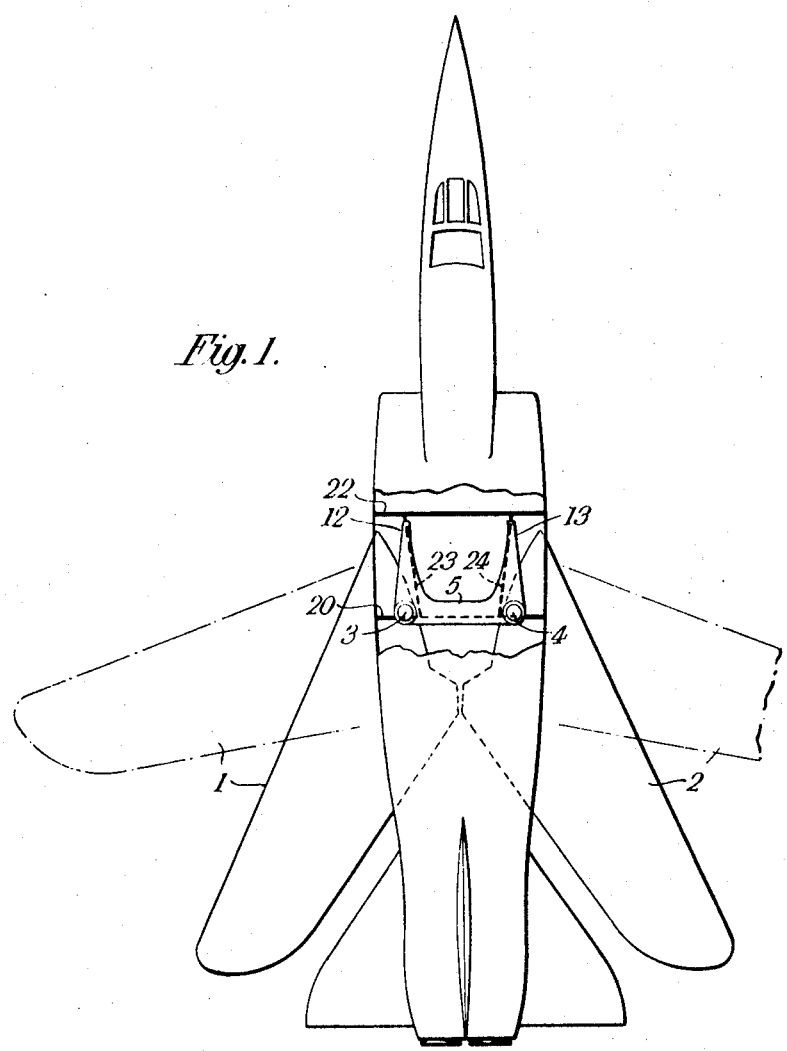

United States Patent

[11] 3,565,369

| [72] | Inventors | Cyril A.C. Barton<br>Penwortham near Preston;<br>Bevan Ridehalgh, Hambleton near<br>Blackpool, England |
|---|---|---|
| [21] | Appl. No. | 722,344 |
| [22] | Filed | Apr. 18, 1968 |
| [45] | Patented | Feb. 23, 1971 |
| [73] | Assignee | British Aircraft Corporation (Operating)<br>Limited<br>London, England |

[54] AIRCRAFT HAVING VARIABLE SWEEP-BACK WINGS
3 Claims, 3 Drawing Figs.

| [52] | U.S. Cl. | 244/46 |
|---|---|---|
| [51] | Int. Cl. | B64c 3/40 |
| [50] | Field of Search | 244/46 |

[56] References Cited
UNITED STATES PATENTS

| 2,683,574 | 7/1954 | Peterson | 244/46 |
|---|---|---|---|
| 2,699,300 | 1/1955 | Trotter et al. | 244/46 |
| 3,018,985 | 1/1962 | Voigt | 244/46 |

FOREIGN PATENTS

| 1,020,393 | 2/1966 | Great Britain | 244/46 |
|---|---|---|---|

*Primary Examiner*—Milton Buchler
*Assistant Examiner*—Jeffrey L. Forman
*Attorney*—Nolte & Nolte ABSTRACT: An aircraft whose wings can move about pivots secured to the fuselage structure for varying the angle of sweepback, wherein the wings are mounted on respective pivots secured in a common subframe member which is detachable from the main fuselage structure. The subframe member also carries an actuation jack for moving the wings about their pivots. The subframe member is attached to the main fuselage structure by means of attachment lugs incorporating eccentrically mounted joints. The arrangement enables the wing pivots to be made more accessible for maintenance. Further, the wings, their pivots and subframe member form a subassembly which can be set up and adjusted remote from the fuselage, thus facilitating manufacture.

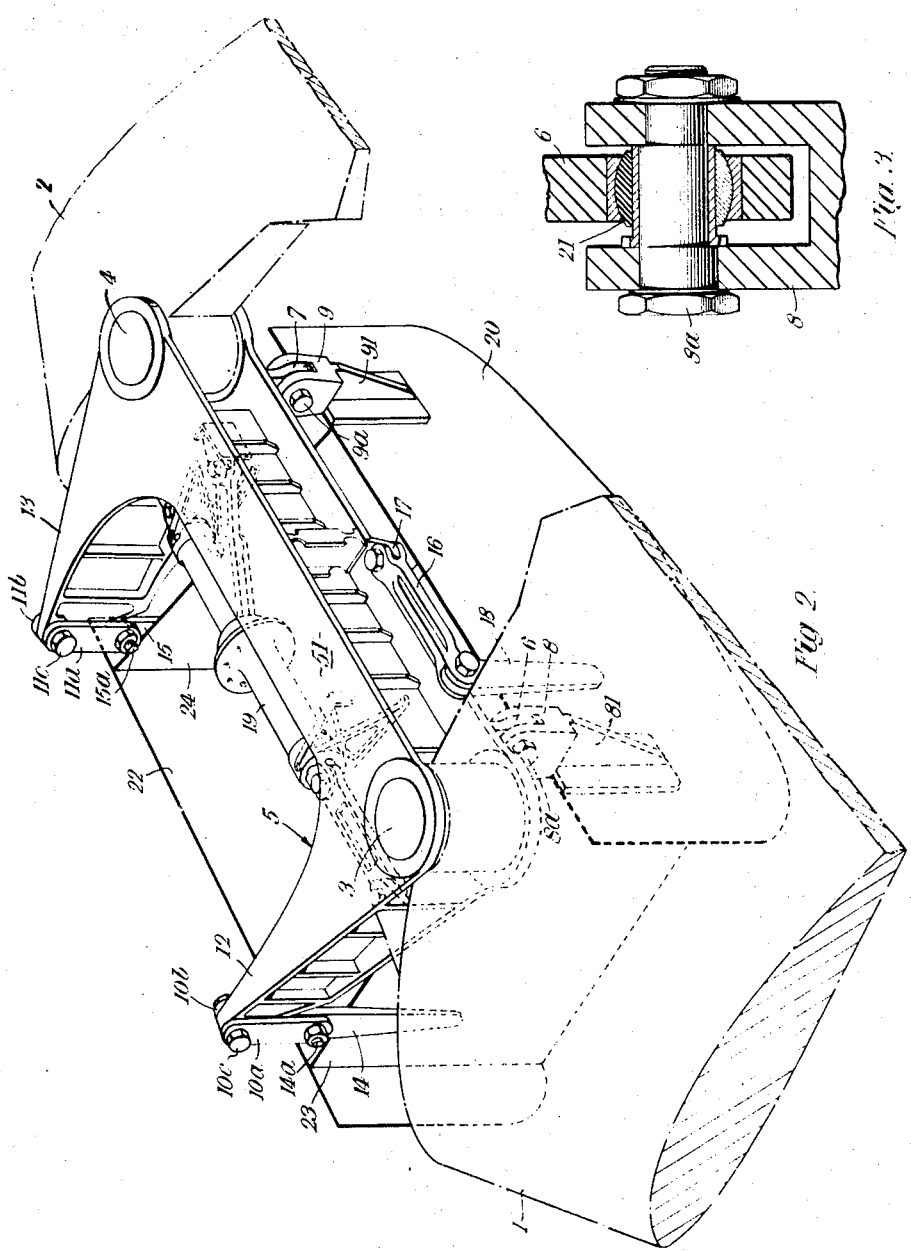

AIRCRAFT HAVING VARIABLE SWEEP-BACK WINGS

This invention relates to aircraft having variable sweepback wings, in which the wings move about pivots secured to the fuselage structure.

According to the invention, the wings are mounted on respective pivots secured in a common subframe member which is detachable from the fuselage structure. Preferably the subframe member also carries an actuation jack for effecting movement of the wings about their pivots to vary the sweepback.

With this arrangement, the wing pivots no longer have to be mounted close to members of the main fuselage structure and they can therefore be made more accessible for maintenance. Further, during manufacture, the wings can be attached to the subframe member, with the actuation jack, to form a subassembly which can be set up and adjusted remote from the fuselage. The wing systems are preferably designed so that a complete check of their functioning can be carried out at this subassembly stage.

Subsequently the subassembly is attached to the fuselage, preferably by means of attachment lugs incorporating eccentrically mounted joints, so that the wings can be correctly adjusted relative to the fuselage an assembly, For maintenance or repair, when the aircraft is in service, the whole subassembly can readily be removed from the aircraft.

A specific embodiment of the invention will now be described in more detail by way of example and with reference to the accompanying drawings, in which:

FIG. 1 is a diagrammatic plan view of an aircraft with part of the center-section broken away to show the wing attachment subframe member, FIG. 2 is a somewhat diagrammatic three-quarter rear view, from above, of the subframe member, showing its attachment to the main fuselage structure, and FIG. 3 is a section through one of the attachment lugs.

As shown in FIG. 1, the aircraft has wings 1, 2 mounted on pivots 3, 4 respectively, carried by a subframe member 5. In FIG. 2 of the drawings, the aircraft wings are illustrated in chain-dot outline at 1 and 2 respectively. The wings pivot in the fore and aft direction about the pivots 3 and 4 respectively. The subframe 5 comprises a crosspiece 51 carrying the wing pivots 3, 4 at its ends and a pair of forwardly projecting arms 12, 13 which converge towards the front.

Lugs 6 and 7 extend from the underside of the wing attachment subframe 5 for connection to bifurcated lugs 8, 9 mounted on brackets 81, 91 which are secured to a transverse frame member 20 forming part of the main aircraft fuselage structure. Lugs 8, 9 are connected to lugs 6, 7 respectively, through eccentrically mounted spherical bearings 21 (FIG. 3), through which fuselage attachment bolts 8a, 9a are located.

Pairs of links 10a, 10b and 11a, 11b are connected, by means of bolts 10c, 11c locating in spherical bearings, to the forward ends of the arms 12 and 13 of the wing attachment subframe 5. The lower ends of the links 10a, 10b and 11a, 11b locate on each side of lugs 14 and 15, respectively, extending upwardly from longitudinal frame members 23, 24 of the fuselage structure. Lugs 14, 15 are provided with eccentrically mounted spherical bearings, similar to those shown in FIG. 3, to accept fuselage attachment bolts 14a, 15a. The longitudinal frame members 23, 24 are joined by a second transverse frame member 22, so that the frame members 20, 22, 23, 24 together form a stiff box structure to take the loads from the wing assembly.

A transverse link 16 is attached to a horizontal lug 17 on the subframe 5 and to a vertical lug 18 on the rear transverse frame member 20 to provide lateral location for the subframe 5. The lug 18 also incorporates an eccentrically mounted spherical bearing.

A wing sweep actuation jack is shown at 19, located on the wing attachment subframe 5.

As explained above, the wings 1, 2, subframe 5 and actuation jack 19 form a subassembly which can be set up and adjusted and checked for correct functioning remote from the fuselage. On attachment of the subassembly to the fuselage, the eccentrically mounted spherical bearings in the fuselage lugs 8, 9, 14, 15 and 18 enables the wings to be correctly adjusted or rigged relative to the fuselage to eliminate any errors due to manufacturing tolerances.

We claim:

1. An aircraft whose wings can move about pivots secured to the fuselage structure for varying the angle of sweepback, wherein the wings are mounted on respective pivots secured in a common subframe member, said subframe member comprising a crosspiece extending across the fuselage and a pair of forwardly projecting arms extending from the respective ends of said crosspiece, said wing pivots being mounted in respective ends of said crosspiece, said subframe member being detachably secured to the main fuselage structure by securing means provided adjacent the ends of the crosspiece and at the forward ends of the arms, said securing means including adjusting means by which the subframe member and hence the wing pivots and wings can be adjusted relative to the fuselage, and wherein each of said securing means comprises an attachment lug on said subframe member and a cooperating lug on said main fuselage structure, said lugs being connected to one another through eccentrically mounted bearings.

2. An aircraft according to claim 1 wherein said eccentrically mounted bearings are spherical.

3. An aircraft according to claim 1 further comprising a transversely extending link connected at one end to the subframe member and at its other end to the main fuselage structure, the connection to the main fuselage structure including an eccentrically mounted spherical bearing.